United States Patent [19]

Fourrey et al.

[11] Patent Number: 4,973,032

[45] Date of Patent: Nov. 27, 1990

[54] MEMBER FOR CONNECTING THE TENSIONING WIRES OF A SEAT CUSHION, AND SEAT CUSHION

[75] Inventors: Francois Fourrey, Montbeliard; Serge Deley, Seloncourt, both of France

[73] Assignee: ECIA - Equipements Et Composants Pour L'Industrie Automobile, Audincourt, France

[21] Appl. No.: 373,839

[22] Filed: Jun. 29, 1989

[30] Foreign Application Priority Data

Jun. 30, 1988 [FR] France .................... 88 08872

[51] Int. Cl.⁵ .............................................. A47C 7/26
[52] U.S. Cl. .................................. 267/144; 267/105; 267/106; 267/110; 267/111
[58] Field of Search ............... 267/91, 80, 87, 86, 267/88, 89, 95, 96, 97, 98–101, 102–112, 165, 144; 5/254, 257, 246, 247, 255, 261, 260, 259, 282, 274, 275, 270

[56] References Cited

U.S. PATENT DOCUMENTS

| | | |
|---|---|---|
| 898,429 | 9/1908 | Brage .................... 5/275 |
| 2,031,745 | 2/1936 | Stubnitz .................... 267/101 X |
| 2,642,932 | 6/1953 | Neely et al. . |
| 2,643,705 | 6/1953 | Neely .................... 267/107 X |
| 2,695,658 | 11/1954 | Flint .................... 267/144 X |
| 2,698,651 | 1/1955 | Flint .................... 267/144 |
| 2,722,975 | 11/1955 | Herider .................... 267/101 |
| 2,815,066 | 12/1957 | Hupp .................... 267/98 X |
| 3,292,921 | 12/1966 | Winkler et al. .................... 267/110 |
| 3,560,049 | 2/1971 | Burton .................... 267/110 X |
| 3,628,780 | 12/1971 | Saito .................... 267/110 |
| 4,055,337 | 10/1977 | Laiche et al. .................... 267/101 |
| 4,092,749 | 6/1978 | Klancnik .................... 5/247 X |
| 4,872,227 | 10/1989 | Galumbeck .................... 5/246 |

FOREIGN PATENT DOCUMENTS

| | | |
|---|---|---|
| 1282875 | 2/1961 | France . |
| 2013955 | 4/1970 | France . |
| 2086918 | 12/1971 | France . |

Primary Examiner—Douglas C. Butler
Attorney, Agent, or Firm—Sughrue, Mion, Zinn, Macpeak & Seas

[57] ABSTRACT

The member is intended to connect the zigzag tensioning wires mounted parallel to each other in a frame reinforcing a seat cushion. It comprises a flat bar (12) provided at regular intervals with gripping lugs (14) pressing against the bar a straight portion of the wire which is parallel to this bar. Side walls (16, 17) of the bar comprise spaced notches for receiving and fixing portions (4b) of the wire substantially perpendicular to the bar. Since the bar has a lug gripping each wire, the latter are kept at a precise distance from each other and the cushion is locally tensioned.

10 Claims, 2 Drawing Sheets

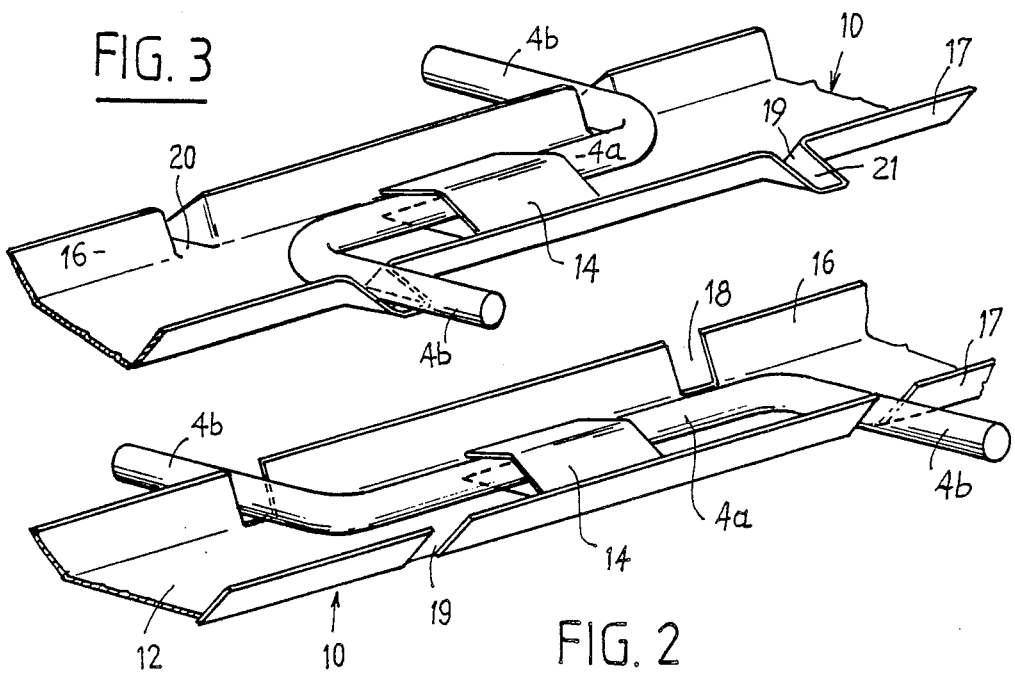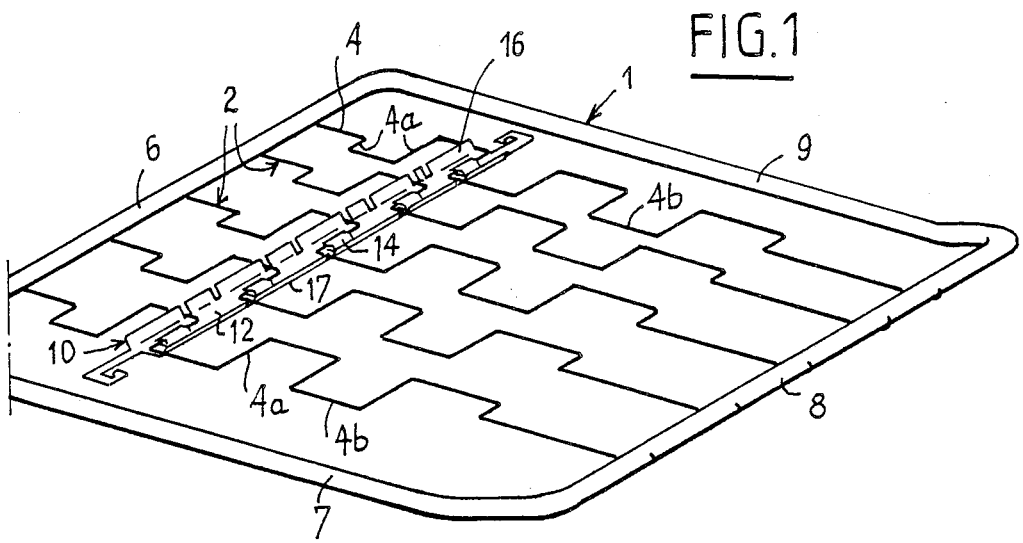

MEMBER FOR CONNECTING THE TENSIONING WIRES OF A SEAT CUSHION, AND SEAT CUSHION

BACKGROUND OF THE INVENTION

Seat cushions, and in particular motor-vehicle seat cushions, generally comprise a reinforcement formed by a frame inside which there is mounted a layer of tensioning wires intended to support padding. The tensioning wires are most often bent in a zigzag between the two opposite sides of the frame, but are arranged parallel to one other. If they are not joined together, they have the tendency, after a certain period of use, to move apart and to make the seat too soft.

They are therefore often joined together, as described in No. FR-A-1,282,875, by means of cross-members which are hooked onto straight parts of the successive wires. However, the positioning of these members calls for a special hooking tool, which is very costly and requires a relatively large amount of time.

SUMMARY OF THE INVENTION

The object of the present invention is to overcome this drawback by providing a member for connecting the tensioning wires, which ensures that a given distance is maintained between the different wires and locally tensions the cushion, while being very simple and inexpensive to install.

This invention in fact relates to a connecting member which consists of an elongated flat bar comprising, at regular intervals, lugs gripping a transverse straight part of a wire against the bar and means for centering each tensioning wire relative to the corresponding gripping lug.

According to a preferred embodiment, the bar comprises, on at least one of its longitudinal sides, a raised edge provided with notches for fixing the tensioning wire.

Preferably, the bar comprises a longitudinal raised edge on each of its sides and each gripping lug is located at the same distance from two notches formed in the two opposite raised edges of the bar.

Each tensioning wire is thus fixed in a welldefined position and the connecting member ensures at the point where it is located actual tensioning of the cushion assembly.

According to another feature, the flat bar is provided at each of its ends with a hook. Thus, when mounted on a seating reinforcement, it may serve to fix a rear flap of the backrest, or the like.

The following description of embodiments, which are provided by way of a non-limiting example and shown in the accompanying drawings, will highlight in more detail the advantages and features of the invention.

In these drawings:

Brief Description of the Drawings

FIG. 1 is a plan view of a seat cushion reinforcement provided with a connecting member according to the invention.

FIG. 2 is a partial view, on a larger scale, of the connecting member of FIG. 1.

FIG. 3 is a view, similar to FIG. 2, of an alternative embodiment.

Description of Preferred Embodiments

Figure 4:
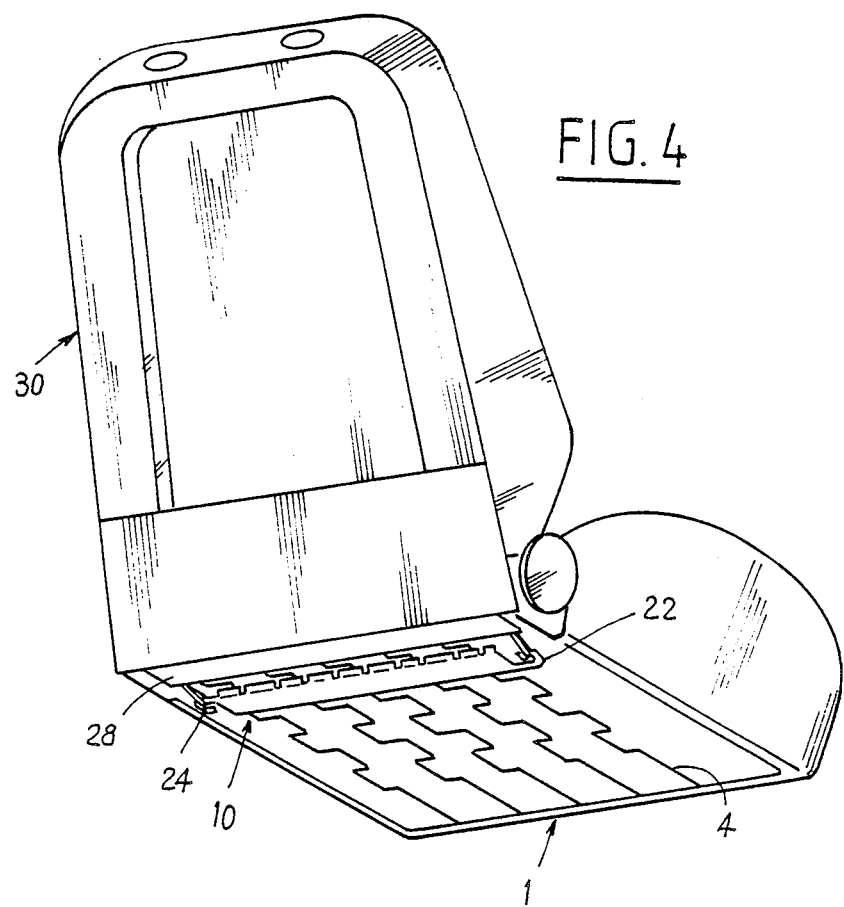
FIG. 4 is a perspective view of a seat, the seating of which is provided with a connecting member according to the invention.

The seat cushion reinforcement shown in FIG. 1 comprises, conventionally, a reinforcement frame 1 inside which there is mounted a layer 2 of tensioning wires intended to support padding. The layer 2 in fact consists of a certain number of wires 4 which are parallel to each other and fixed at their ends onto two opposite bars 6 and 8, respectively, of the frame 1. All the wires 4 are folded in a zigzag in identical fashion, i.e. they each comprise a succession of portions 4a parallel to the bars 6 and 8, and portions 4b parallel to the two other sides 7 and 9 of the frame 1. The successive portions 4a or 4b may have different dimensions, but are identical for all the wires 4.

In at least one location of the layer 2, the wires 4 are joined together by a connecting member 10 consisting of a flat bar 12 provided at regular intervals with lugs 14 each gripping a straight portion 4a of one of the wires 4.

In the embodiment shown, each gripping lug 14 has been cut out from the flat plate 12 and pushed back towards the outside by a distance similar to the diameter of the tensioning wire 4 which it must retain. This lug is moreover folded in the form of an inverted wide-angle V which allows the wire to pass through at right angles to its apex, but the free longitudinal edge of which is located at a distance from the flat strip less than the diameter of the wire and is sufficiently close to the bar 12 to prevent the wire from escaping by means of transverse displacement. The wire is thus rigidly held and gripped against the connecting member 10.

On at least one of its longitudinal edges, the flat bar 12 comprises a raised edge provided, at regular intervals, with notches, the diameter of which is slightly greater than that of the tensioning wire 4. Preferably, however, as shown, the bar 12 comprises two side walls 16 and 17 slightly inclined towards the outside and each provided with notches 18, 19, respectively, and these notches are spaced from each other such that the distance between a notch 18 and a notch 19, situated on either side of a gripping lug 14, corresponds to the length of a transverse straight portion 4a of a tensioning wire 4.

Moreover, the number of assemblies formed by a gripping lug 14 and two notches 18 and 19 situated on either side of this lug corresponds to the number of tensioning wires 4 of the layer. Thus, as shown more particularly in FIGS. 1 and 2, when a connecting member 10 is mounted on a cushion reinforcement parallel to the edges 6 and 8 of the reinforcement frame, i.e. parallel to the transverse portions 4a of the tensioning wires 4, each of these wires is held by a gripping lug 14 which retains the corresponding transverse portion 4a, while it is fixed laterally by the longitudinal portions 4b passing into the notches of the lateral edges 16 and 17. One of these longitudinal portions passes in fact through a notch 18 of the side wall 16, while the other one passes through a notch 19 of the opposite wall 17.

The connecting member 10, being made of relatively rigid material, ensures tensioning of the corresponding portion of the reinforcement and moreover prevents lateral displacement of the tensioning wires, i.e. keeps them at a well-defined distance from each other.

The notches 18 and 19 may be formed by a simple cut-out in the side walls 16 and 17 as shown in FIG. 2.

They may also, according to an o t h e r embodiment shown in FIG. 3, be formed by means of local swaging of the side walls 16 and 17 of the connecting member 10 such that the flat bar is extended at right angles to each notch by a tongue 20, 21 for supporting the tensioning wire 4b.

It will be obvious that a single connecting member 10 may be sufficient to ensure tensioning of a cushion reinforcement and holding of the desired tensioning wires. However, several similar connecting members 10 may be mounted on one and the same cushion reinforcement.

Installation of this connecting member is in fact performed extremely easily by fitting the tensioning wires into the notches and underneath the gripping lugs, without a special tool or additional parts.

This connecting member is, moreover, perfectly suited both for seating cushion reinforcements and backrest cushion reinforcements.

Figure 5:
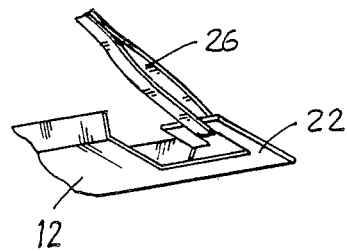
FIG. 5 is a detailed view of the end hook of the connecting member.

When it is intended for a seating cushion reinforcement, the connecting member is preferably extended at each of its ends by a hook 22, 24 which forms an extension of the flat bar 12 and is situated in the plane of this bar, as is shown clearly in FIGS. 4 and 5. The hooks 22 and 24 of the two ends of the connecting member enable a buckle 26 belonging to a trimming element of the backrest of the seat to be easily and securely fixed onto each of them. For example, in the embodiment shown in FIG. 1, each of the buckles 26 is integral with one of the ends of the flap 28 of the trimming of the backrest 30 of the seat shown.

Thus, an increase in the strength of a seat cushion and consequently in its life and in the duration of the comfort which it affords, is thus obtained, in a very simple manner, by means of a member which is inexpensive and easy to arrange in position.

What is claimed is;

1. In a cushion, for a motor vehicle seat or the like, comprising: a reinforcement frame (1) in the bottom of the cushion and having two transversely extending opposite bars (6, 8); and a plurality of longitudinally-extending, transversely-spaced zigzag tensioning wires (4) which are parallel to each other and are arranged in a layer (2) placed inside said frame (1), each of said wires having two opposite ends, which are respectively fixed to one of said bars (6, 8), and having a succession of straight wire portions (4a, 4b) which are alternately parallel (4a) and perpendicular (4b) to said bars (6, 8); the improvement comprising at least one transversely-extending connecting member (10), disposed between said opposite bars (6, 8), for interconnecting said wires (4); said member (10) comprising a relatively flat elongated bar (12) having two opposite ends and a central part between said ends; said central part being provided with a plurality of transversely spaced gripping lugs (14) for fastening said parallel straight wire portions (4a) against said bar (12), and with a plurality of guide means (18, 19; 20, 21) for cooperating with said perpendicular straight wire portions (4b) to center said wires (4) a relative to said lugs (14).

2. The improvement according to claim 1, wherein said elongated bar (12) comprises, on at least one of its longitudinal edges, a transversely-extending side wall (16), and wherein said guide means comprises a plurality of notches (18, 19), in said side wall, for fixing said perpendicular straight wire portions (4b) against transverse movement, said notches being spaced at regular transverse intervals along the length of said side wall (16).

3. The improvement according to claim 2, characterized in that the notches (18, 19) are cut-outs in the side wall (16, 17) of the connecting member.

4. The improvement according to claim 2, characterized in that the notches (18, 19) are swaged depressions in the side wall (16, 17) of the connecting member, each depression having a longitudinally extending tongue portion (21) for supporting a perpendicular straight wire portion (4b).

5. The improvement according to claim 2, characterized in that said flat bar (12) comprises, on an opposite longitudinal edge, a second side wall provided with regularly spaced notches (18, 19), and wherein each gripping lug (14) is located halfway between two of said notches (18, 19) of said first and second sidewalls, respectively.

6. The improvement according to claim 2, characterized in that each gripping lug (14) is integral with the flat bar (12) and extends upwardly and longitudinally.

7. The improvement according to claim 2, characterized in that each of the ends of the flat bar (12) has a hook means (22, 23), situated in the plane of said bar, for attachment to a trimming element (28) of a backrest (30) associated with said cushion.

8. The improvement according to claim 2, characterized in that each of the notches has a diameter slightly greater than that of a tensioning wire (4) and forms a passage for a perpendicular straight wire portion (4b) which is perpendicular to the parallel straight wire portion (4a) fastened by the gripping lug.

9. The improvement according to claim 2, wherein said parallel straight wire portions (4a) are of equal length, and wherein the transverse space between adjacent notches (18, 19) is equal to said length of said parallel straight wire portions (4a).

10. The improvement according to claim 1, characterized in that each gripping lug (14) has a crosssection in the form of an inverted V, and the distance between free edge and the flat bar (12) is less than the diameter of parallel straight wire portion (4a) fastened by the lug (14).

* * * * *